United States Patent [19]

Silver et al.

[11] Patent Number: 5,215,818
[45] Date of Patent: Jun. 1, 1993

[54] PRESSURE-SENSITIVE ADHESIVE COMPRISING SOLID TACKY MICROSPHERES AND MACROMONOMER-CONTAINING BINDER COPOLYMER

[75] Inventors: Spencer F. Silver, White Bear Lake; Roger W. Leinen, Woodbury; Joaquin Delgado, St. Paul, all of Minn.

[73] Assignee: Minnesota Mining and Manufacturing Company, St. Paul, Minn.

[21] Appl. No.: 884,633

[22] Filed: May 15, 1992

Related U.S. Application Data

[62] Division of Ser. No. 512,774, Apr. 20, 1990, Pat. No. 5,118,750.

[51] Int. Cl.⁵ ............................. B32B 5/08; C09J 7/04
[52] U.S. Cl. ..................... 428/343; 428/344; 524/356; 524/462; 524/463; 524/474; 524/502; 524/504
[58] Field of Search ............... 524/356, 462, 463, 474, 524/502, 504; 428/343, 344

[56] References Cited

U.S. PATENT DOCUMENTS

| | | | |
|---|---|---|---|
| 3,578,622 | 5/1971 | Brown et al. | 260/33.8 |
| 3,691,140 | 9/1972 | Silver | 260/78.5 |
| 3,857,731 | 12/1974 | Merrill et al. | 117/122 |
| 4,554,324 | 11/1985 | Husman et al. | 525/301 |
| 4,656,218 | 4/1987 | Kinoshita | 524/460 |
| 4,735,837 | 4/1988 | Miyasaka et al. | 428/40 |
| 5,141,790 | 8/1992 | Calhoun et al. | 428/343 |
| 5,143,972 | 9/1992 | Grover | 428/343 |

FOREIGN PATENT DOCUMENTS 0209337 7/1986 European Pat. Off.
3544882A1 5/1985 Fed. Rep. of Germany.

OTHER PUBLICATIONS

References A to F, L and M were cited in Parent Case now U.S. Pat. No. 5,118,750 & now submitted on PTO-1449 dated Oct. 24, 1992.

*Primary Examiner*—Jacob Ziegler
*Attorney, Agent, or Firm*—Gary L. Griswold; Walter N. Kirn; Janice L. Dowdall

[57] ABSTRACT

A repositionable pressure-sensitive adhesive comprising from about 70% to about 99% solid, polymeric, acrylate, inherently tacky, infusible, solvent-insoluble, solvent-dispersible, elastomeric microspheres comprising at least one alkyl acrylate or alkyl methacrylate ester; and at least one polar monomer, and correspondingly, from about 30% to about 1% of a binder copolymer comprising an elastomeric polymeric backbone having pendant therefrom high Tg polymeric moieties.

4 Claims, No Drawings

PRESSURE-SENSITIVE ADHESIVE COMPRISING SOLID TACKY MICROSPHERES AND MACROMONOMER-CONTAINING BINDER COPOLYMER

This is a division of application Ser. No. 07/512,774 filed Apr. 20, 1990, now U.S. Pat. No. 5,118,750.

BACKGROUND OF THE INVENTION

1. Field of the Invention

This invention relates to a composition containing a dispersion of slid polymeric, acrylate, infusible, inherently tacky, elastomeric, solvent-dispersible, solvent-insoluble microspheres and a soluble macromonomer-containing copolymer, and to their use as sprayable repositionable pressure-sensitive adhesives.

2. Description of the Related Art

Solid, inherently tacky, elastomer microspheres are known in the art to be useful in repositionable pressure-sensitive adhesive applications. As used herein, the term "repositionable" refers to the ability to be repeatedly adhered to and removed from a substrate without substantial loss of adhesion capability. Microsphere-based adhesives are thought to perform well in such applications at least in part due to their "self-cleaning" nature, wherein substrate contaminants tend to be pushed aside and trapped between the microspheres as the adhesive is applied. Upon removal, the adhesive then still presents a relatively uncontaminated surface for reapplication to the substrate.

Such spheres and their use in aerosol adhesive systems having repositionable properties are disclosed in U.S. Pat. No. 3,691,140 (Silver). These microspheres are prepared by aqueous suspension polymerization of alkyl acrylate monomers and ionic comonomers, e.g., sodium methacrylate, in the presence of an emulsifier, preferably an anionic emulsifier. The use of a water-soluble, substantially oil-insoluble ionic comonomer is critical to preventing coagulation or agglomeration of the microspheres.

The primary problem associated with these types of adhesives has been microsphere loss, i.e., microsphere transfer to the substrate. The problem is exacerbated when the microspheres are used in aerosol form. This has typically been addressed by the use of a binder or primer for the microspheres.

U.S. Pat. No. 3,857,731, (Merrill et al.) and EPA 0209337, Thomson et al. both address microsphere transfer problems. The former discloses sheets coated with tacky elastomeric copolymer microspheres and a binder material which provides sockets in which the microspheres are held by predominantly mechanical forces. Additional chemical forces are not required; in fact, it is further stated at column 1, at line 62 that the binder "need not have a high degree of adhesion for the microspheres, and in fact, binders having an extremely low adhesion for the microspheres provide an excellent microsphere retaining surface". A wide range of useful binders are disclosed including hard resins such as an epoxy or nitrocellulose composition, soft resins such as acrylate or vinyl ether, urethanes, fluorochemicals, silicones and microcrystalline waxes. Preferably, the binder is used at a level of 0.20 to 0.60 parts of binder to 1 part microsphere. Adhesives are disclosed to have a maximum adhesion of 25.9 g/cm.

The latter discloses microsphere adhesives which achieve reduced transfer via addition of an adhesion promoting monomer, such as a vinyl pyridine, having functionality which remains unreacted during polymerization. This functionality is available for subsequent binding of the microspheres through electrostatic interaction or chemical bonding to a substrate, which may be primed. This increased bonding to the substrate is stated to reduce microsphere transfer. It is also disclosed that a binder may be blended with the microspheres.

DE 3,544,882 A1, Nichiban, describes crosslinked microspheres composed of (meth)acrylate ester and vinyl type monomer, e.g., acrylic acid, having a reactive functional group through which crosslinking is achieved. When tacky, the spheres are said to be useful in spray or coated sheet form as "removable adhesive". As in Thomas, the adhesive transfer of the microspheres is reduced via the use of secondary comonomers. Comonomers disclosed as useful include vinyl acetate, styrene, and acrylonitrile, and may be present in amounts of up to 50 percent of the (meth)acrylate ester monomer.

U.S. Pat. No. 4,656,218, (Kinoshita) discloses a releasable sheet coated with a microsphere adhesive which is disclosed to have superior anchorage to the substrate. The adhesive is prepared by a complex mechanism involving two separate polymerizations. First, a suspension polymerization forms the microspheres. This is followed by an emulsion polymerization wherein a latex binder is formed in situ from alpha-olefin carboxylic acids such as acrylic acid in the presence of the microspheres. The latex is disclosed to consist of microparticles having average diameter of from 1-4 microns. The binder is stated to have no effect on the properties of the adhesive and to be effective in improving the anchorage of the microspheres to the substrate. However, performing such a complex dual polymerization may result in coagulation of the preformed microspheres as the latex forms in situ. No aerosol adhesives are disclosed. Tackifiers are disclosed as preferred optional ingredients.

U.S. Pat. No. 4,735,837, (Miyasaka et al.) discloses a detachable adhesive sheet having an adhesive layer containing "elastic micro-balls" with the ratio of adhesive to micro-balls being from about 1:10 to about 10:1. The density of the micro-balls for an optimal balance of adhesive and removability is disclosed to be from 1,000 to 150,000 pieces per square centimeter. The micro-balls may or may not be tacky. They can be derived from, e.g., (meth)acrylate monomer and an α-olefinic carboxylic acid monomer via suspension polymerization in an aqueous medium. However, no details as to the nature of the surfactants utilized, etc., are disclosed. The micro-balls and an adhesive are dispersed in solvent, mixed, and coated, with the ratio of adhesive to micro-balls being form about 1:10 to about 10:1. This ratio is disclosed to be critical in order that all micro-balls in the final product, including those protruding from the surface, are completely covered with the adhesive.

In an aerosol adhesive, the sprayability of the adhesive is critical. Several patents disclose nonparticulate adhesives having good sprayability. U.S. Pat. No. 3,578,622, (Brown et al.), discloses an acrylate aerosol spray adhesive which is non-cobwebbing, and does not form rubbery strings. The aerosol composition contains at least 2% of a pressure-sensitive crosslinked, elastomeric, acrylate polymer having an insolubility index of from about 0.5 to 0.97, and a carrier liquid. Acrylic acid esters are disclosed as preferred acrylate polymers. The use of a tackifier is also disclosed.

U.S. Pat. No. 4,554,324, (Husman et al.) discloses a high-performance pressure-sensitive adhesive with good peel and shear properties comprising a polymer having an inherent viscosity greater than 0.2 and having in its backbone at least a major portion by weight of polymerized monomeric acrylic or methacrylic acid ester of a non-tertiary alcohol, and having attached to the backbone polymeric moieties having a weight average molecular weight of above 2000 and a $T_g$ of 20° C. or higher. No particulate or aerosol adhesives are disclosed.

It has now been discovered that the use of a macromolecular monomer-containing copolymer as a binder for solid polymeric, acrylate, inherently tacky elastomeric microspheres provides a particulate, i.e., microsphere, adhesive having both excellent sprayability and low adhesive transfer. These compositions have significantly reduced transfer when compared to adhesives containing no macromonomer-containing binder. They can be easily formulated to specific spray dispensing requirements without the need for preparation of new compositions (e.g., by adjustment of binder content, propellant, and the like).

SUMMARY OF THE INVENTION

This invention provides pressure-sensitive adhesive comprising solid, polymeric, acrylate, inherently tacky, infusible, solvent-insoluble, solvent-dispersible, elastomeric microspheres, and at least about 1% of a micromolecular monomer-containing (macromonomer-containing) elastomeric binder copolymer.

In addition to pressure-sensitive adhesives based on the combination of solid microspheres and binder copolymers, the invention further provides organic dispersions of the microspheres and binder copolymers, spray repositionable pressure-sensitive adhesive compositions, and pressure-sensitive adhesive-coated sheet materials.

More specifically, the pressure-sensitive adhesive comprises:

a) from about 70% to about 99% solid, polymeric, acrylate, inherently tacky, infusible, solvent-insoluble, solvent-dispersible, elastomeric microspheres comprising
   i) at least one alkyl acrylate or alkyl methacrylate ester; and
   ii) at least one polar monomer, and
b) correspondingly, from about 30% to about 1% of a binder copolymer comprising an elastomeric polymeric backbone having pendant therefrom polymeric moieties, such backbone containing repeating A and C monomers, and from about 1% to about 20% B monomers, wherein
   A is a monomeric acrylic or methacrylic acid ester of a non-tertiary alcohol, said alcohol having from 1 to 14 carbon atoms, with the average number of carbon atoms being about 4–12, said A monomer comprising from about 50% to about 98% of said monomers;
   B is a polar monomer copolymerizable with said monomeric acrylic acid ester;
   C is a monomer having the general formula X—(Y)-$_n$—Z, wherein X is a vinyl group copolymerizable with said A and B monomers, Y is a divalent linking group, where n is zero or 1, and Z is a monovalent polymeric moiety having a $T_g$ greater than 20° C., and a molecular weight in the range of about 2,000 to about 30,000, and being essentially unreactive under copolymerization conditions, C comprising from about 1% to about 30% of said monomers, wherein said binder copolymer has a shear storage modulus of at least about $1.0 \times 10^5$ Pascals at 22° C. and 3 Hz.

The following terms have these meanings as used herein:

1. The term "macromonomer" means a macromolecular monomer as disclosed in U.S. Pat. No. 3,786,111.

2. The terms "macromonomer-containing binder copolymer", "binder copolymer", "elastomeric binder copolymer", and the like are used interchangeably to refer to macromolecular monomer-containing elastomeric binder copolymers.

All weights, parts, and ratios herein are by weight unless specifically stated otherwise.

DETAILED DESCRIPTION OF THE INVENTION

The pressure-sensitive adhesives of the invention comprise from about 70% to about 99% solid microspheres, and correspondingly from about 30% to about 1% of a solvent-soluble, macromonomer containing binder copolymer.

The solid microspheres comprise at least one alkyl acrylate or alkyl methacrylate ester and one or more polar monomers. Preferably, at least one polar monomer is included in the composition, but solid microspheres may also be prepared using acrylate or methacrylate monomer(s) alone or in combination only with other vinyl monomers, e.g., vinyl acetate. However, when methacrylate monomer alone is utilized, a crosslinking agent, infra, must be included. For most polar monomers, incorporation of from about 1 part to about 15 parts by weight is preferred, as this ratio provides solid microspheres with balanced pressure-sensitive adhesive properties.

Alkyl acrylate or methacrylate monomers useful in preparing the solid microspheres for pressure-sensitive adhesives of this invention are those monofunctional unsaturated acrylate or methacrylate esters of non-tertiary alkyl alcohols, the alkyl groups of which have from 4 to about 14 carbon atoms. Such acrylates are oleophilic, water emulsifiable, have restricted water solubility, and as homopolymers, generally have glass transition temperatures below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. Acrylate or methacrylate or other vinyl monomers which, as homopolymers, have glass transition temperatures higher than about −20° C., e.g., tert-butyl acrylate, isobornyl acrylate, butyl methacrylate, vinyl acetate, N-vinyl pyrrolidone, acrylamide, and the like, may be utilized in conjunction with one or more of the acrylate or methacrylate monomers provided that the glass transition temperature of the resultant polymer is below about −20° C. Preferred microspheres used in the invention comprise at least about 85 parts by weight of the alkyl acrylate or methacrylate monomer.

Polar monomers suitable for copolymerization with the arylate or methacrylate monomers are those polar monomers which are both somewhat oil-soluble and water-soluble, resulting in a distribution of the polar monomer between the aqueous and the oil phases. Correspondingly, preferred microspheres contain up to about 15 parts of the polar monomer.

Representative examples of suitable polar monomers include weakly to moderately ionized polar monomers such as acrylic acid, methacrylic acid, itaconic acid, crotonic acid, maleic acid, fumaric acid, sulfoethyl methacrylate, and ionic monomers such as sodium metharylate, ammonium acrylate, sodium acrylate, tri-methylamine p-vinyl benzimide, 4,4,9-trimethyl-4-azonia-7-oxo-8-oxa-dec-9-ene-1-sulphonate, N,N-dimethyl-N-($\beta$-methacryloxyethyl) ammonium propionate betaine, trimethylamine methacrylimide, 1,1-dimethyl-1-(2,3-dihydroxypropyl)amine methacrylimide, and the like, Preferred polar monomers are mono-olefinic mono- and dicarboxylic acids, salts thereof, and mixtures thereof.

The composition may also contain a crosslinking agent such as a multifunctional (meth)acrylate, e.g., butanediol diacrylate or hexanediol diacrylate, or other multifunctional crosslinker such as divinylbenzene. When used, crosslinker(s) is (are) added at a level of up to about 0.5 mole percent, preferably up to about 0.1 mole percent, of the total polymerizable composition.

The solid microspheres are normally tacky, elastomeric, insoluble but swellable in organic solvents, and small, typically having diameters of at least about 1 micrometer, preferably in the range of about 1 to about 250 micrometers.

The microspheres are prepared by an aqueous suspension polymerization technique utilizing ionic or nonionic emulsifiers in an amount greater than the critical micelle concentration and/or protective colloids, finely divided inorganic solids, or the like. The critical micelle concentration is here defined as that minimum concentration of emulsifier necessary for the formation of micelles. Critical micelle concentration is slightly different for each emulsifier, usable concentrations ranging from bout $1.0 \times 10^{-4}$ to about 3.0 moles/liter. Initiators for polymerizing the monomers to provide the spheres of the invention are those which are normally suitable for free-radical polymerization of acrylate monomers and which are oil-soluble and of very low solubility in water such as, for example, benzoyl peroxide. Use of a water-soluble catalyst causes formation of substantial amounts of latex, the extremely small particle size and solubility of latex particles being undesirable. Concentration of initiator will affect microsphere quality and, therefore, should be on the order of about 0.1 to about 1.0 percent by weight, of the total suspension, preferably about 0.25 to about 0.5 percent.

Following polymerization, an aqueous suspension of the solid microspheres is obtained which is stable to agglomeration or coagulation under room temperature conditions. The suspension may have non-volatile solids contents of from about 10 to about 75 percent by weight. Upon prolonged standing, the suspension separates into two phases, one phase being aqueous and substantially free of polymer, the other phase being an aqueous suspension of solid microspheres. Both phases may contain a minor portion of small latex particles. Decantation of the microsphere-rich phase provides an aqueous suspension having a non-volatile solids content on the order of about 60-75 percent which, if shaken with water, will readily redisperse.

The aqueous suspension may be coagulated with polar organic solvents such as methanol, with ionic emulsifiers having a charge opposite to that of the emulsifier used in the polymerization process, or with saturated salt solutions, or the like, followed by washing and drying. The dried solid microspheres, with sufficient agitation, will readily disperse in common organic liquids such as ethyl acetate, tetrahydrofuran, heptane, 2-butanone, benzene, cyclohexane, and esters, although it is not possible to resuspend them in water.

Binder copolymers useful in adhesives of the invention are copolymers having an adherent viscosity of at least about 0.4 dl/g. For aerosol applications, the preferred range is from about 0.4 to about 1.2 dl/g. The copolymers contain repeating units of A and C monomers, and B monomers. A is a monomeric acrylic or methacrylic acid ester of a nontertiary alkyl alcohol having an average number of carbon atoms from about 4-12. B is a polar monomer copolymerizable with the monomeric arylic acid ester. Preferred B monomers are acrylic acid, methacrylic acid, acrylamide, metahcrylamide, and N-vinyl pyrrolidone. The B monomer(s) are present in amounts from about 1 part to about 20 Parts. The C monomer has the general formula $X-(Y)_n-Z$ wherein X is a vinyl group copolymerizable with the A and B monomers, Y is a divalent linking group wherein n can be either zero or one, and Z is a monovalent polymeric moiety having a $T_g$ greater than 20° C. and a weight average molecular weight in the range of about 2,000 to 30,000 and being essentially unreactive under copolymerization conditions. The vinyl group of the C monomer and the A and B monomers are copolymerized to form an elastomeric backbone having the polymeric moieties pendant therefrom. The weight of the C monomer is within the range of about 1 to about 30% of the weight of all monomers. The total weight of the B and C monomers is from about 2% to about 50% of the weight of all monomers in the copolymer.

The A and B monomers are similar to those used to prepare the solid microspheres. The C monomer is a polymeric material having a copolymerizable vinyl moiety with which the A monomer and the B monomer will copolymerize under the polymerization conditions. The C monomer is represented by the general formula $X-(Y)_n-Z$ as described infra.

The preferred C monomer may be further defined as having an X group which has the general formula

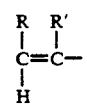

wherein R is a hydrogen atom or a COOH group and R' is a hydrogen atom or methyl group. The double bond between the carbon atoms provides a copolymerizable moiety capable of copolymerizing with the A and B monomers.

The preferred C monomer includes a Z group which has the general formula $$\begin{array}{c} R_2 \\ | \\ \!\!+\!\!C\!\!-\!\!(CH_2)_n\!\!-\!\!R_3 \\ | \\ R_4 \end{array}$$

wherein $R_2$ is a hydrogen atom or a lower alkyl group, $R_3$ is a lower alkyl group, n is an integer from 20 to 500 and $R_4$ is a monovalent radical selected from the group consisting of $$-\!\!\!\bigcirc\!\!\!-R_5$$

and $-CO_2R_6$ wherein $R_5$ is a hydrogen atom or a lower alkyl group and $R_6$ is a lower alkyl group. Preferably the C monomer has a general formula selected from the group consisting of $$\begin{array}{cc} & O \quad H \\ & \| \quad | \\ X\!\!-\!\!C\!\!-\!\!O\!\!-\!\!C\!\!-\!\!CH_2\!\!-\!\!Z \\ & | \\ & R_7 \end{array}$$

$$\begin{array}{cc} O & O \quad H \\ \| & \| \quad | \\ X\!\!-\!\!C\!\!-\!\!O\!\!-\!\!CH_2CH_2\!\!-\!\!NH\!\!-\!\!C\!\!-\!\!O\!\!-\!\!C\!\!-\!\!CH_2\!\!-\!\!Z \\ & | \\ & R_7 \end{array}$$

$$\begin{array}{c} R_7 \\ | \\ X\!\!-\!\!CH_2\!\!-\!\!O\!\!-\!\!C\!\!-\!\!CH_2\!\!-\!\!Z \\ | \\ H \end{array}$$

$$X\!\!-\!\!\!\bigcirc\!\!\!-\!\!CH_2\!\!-\!\!O\!\!-\!\!\overset{H}{\underset{R_7}{C}}\!\!-\!\!CH_2\!\!-\!\!Z$$

$$\begin{array}{cc} O & H \\ \| & | \\ X\!\!-\!\!O\!\!-\!\!C\!\!-\!\!CH_2\!\!-\!\!O\!\!-\!\!C\!\!-\!\!CH_2\!\!-\!\!Z \\ & | \\ & R_7 \end{array}$$

$$\begin{array}{c} H \\ | \\ X\!\!-\!\!OCH_2CH_2\!\!-\!\!O\!\!-\!\!C\!\!-\!\!CH_2\!\!-\!\!Z \\ | \\ R_7 \end{array}$$

wherein $R_7$ is a hydrogen atom or a lower alkyl group.

The vinyl terminated polymeric monomers are sometimes known as macromolecular monomers or macromonomers. Such monomers are known and may be prepared by the method disclosed in U.S. Pat. Nos. 3,786,116, and 3,842,059, Milkovich et al., the disclosures of which are incorporated herein by reference.

Although U.S. Pat. No. 3,786,116 teaches that the molecular weight distribution of the polymer chains of the vinyl-terminated polymeric monomer prior to copolymerization must be less than 1.1 polydispersity, binder copolymers of the invention may employ polymeric monomers having a polydispersity of up to about 3.

The binder copolymer must have a relatively high cohesive strength in order for the final particulate adhesive to exhibit the full reduction in adhesive transfer. One conventional way to increase cohesive strength is to increase the molecular weight. However, for an aerosol adhesive to exhibit satisfactory spray deposition, dispersions must be within a specific rheological window. For a fixed quantity of microspheres (or particles), the rheological behavior is primarily controlled by the amount of binder copolymer present, and its molecular weight. Molecular weights which are too high become difficult to spray, i.e., they exhibit stringing and cobwebbing, resulting in very nonuniform coatings, whereas excessively low molecular weight results in misting and overspray.

Another method of achieving high cohesive strength in polymers is to utilize crosslinking with high molecular weight polymers, which can be detrimental to aerosol sprayability. Surprisingly, the use of preferred amounts of a high cohesive strength binder copolymer containing both a polar monomer, and a high Tg macromonomer satisfies the cohesive strength requirements at relatively low molecular weights. Phase separation of the macromonomer enhances cohesive strength even in lower molecular weight materials. It is believed that this cohesive strength helps to bind the macrospheres more firmly, thereby reducing transfer.

Compositions of the invention therefore exhibit decreased adhesive transfer and excellent sprayability. The repositionability and removability characteristics of the spray pressure-sensitive adhesive derive from the microspheres, whereas the binder provides improved anchorage of the microspheres to the substrate and also provides controlled sprayability by modifying the rheological behavior of the sprayable dispersion.

The cohesive strength can be ascertained by Dynamic Mechanical Analysis of the macromonomer-containing binder copolymers to determine the shear storage modulus (G'). See e.g. S.L. Rosen, *Fundamental Principles of Polymer Materials*, pg. 259, Wiley-Interscience, 1982. The shear storage modulus represents the stored elastic energy when a polymer sample is stressed at a given strain rate. The binder copolymer should have a shear storage modulus of at least about $1.0 \times 10^5$ Pascals, preferably about $1.10 \times 10^5$ Pascals, most preferably about $1.20 \times 10^5$ Pascals, when measured at 3 Hz and 22° C.

The binder copolymer is prepared by free radical polymerization as described, e.g., in U.S. Pat. No. 4,554,324 (Husman et al.), or D. Satas *Handbook of PSA Technology*, 2nd, Ed., p. 908, Van-Norstrand-Rheinhold, N.Y., 1989, incorporated herein by reference.

The particulate pressure-sensitive adhesive of the invention is made by combining a dispersion of solid microspheres with a solution of the binder copolymer. Typically, binder copolymer is used at a ratio of about 1% to about 30%, based on the dry weight of the microspheres. Preferred ranges are dependent on the inherent viscosity ("I.V.") of the binder copolymer selected. For aerosol applications, the preferred amount of binder copolymer is from about 10% to about 25% for binder copolymers having I.V.'s in the range of about 0.4 to 0.8 dl/g, and for those having I.V.'s in the range of 0.8 to 1.2 dl/g, the preferred range is from about 3% to about 20%.

Suitable backing materials for the solvent based coatings include paper, plastic films, cellulose acetate, ethyl cellulose, woven or nonwoven fabric formed of synthetic or natural materials, metal, metallized polymeric film, ceramic sheet material, and the like. Surprisingly, the use of compositions of the invention eliminates the necessity of priming the backing, even paper, prior to coating of the microspheres. Previously, such priming was necessary to achieve an acceptable level of adhesive transfer.

To make an aerosol spray adhesive, an aerosol premix is made by combining a dispersion of solid microspheres in isohexane, or the like, with from about 1% to about 30% binder copolymer based on the dry weight of the solid microspheres. The binder polymer is typically added in a solvent. This premix is then added to an aerosol container and the container charged with a suitable propellant to give a final solids content of about 3%–15%.

Dispersions of the solid microspheres in an organic liquid as described above, may be sprayed by conventional techniques without cobwebbing or may be incorporated in aerosol containers with suitable propellants such as Dymel TM, alkanes, alkenes, or chlorofluorocarbons, e.g., Freons TM, compressed gasses, and the like. The repositionable pressure-sensitive adhesive of the invention provides a degree of peel adhesion which permits separation, repositioning, and rebonding, as well as excellent adhesive transfer characteristics.

Useful premix formulae have a solids content of from about 5% to about 20%, preferably from about 10% to about 16%.

Properties of the pressure-sensitive adhesives of the invention may be altered by addition of tackifying resin and/or plasticizer. Preferred tackifiers for use herein include hydrogenated rosin esters commercially available from companies such as Hercules Inc., under such trade names as Foral TM, and Pentalyn TM. Individual tackifiers include Foral TM 65, Floral TM 85, and Foral TM 105. Other useful tackifiers include those based on t-butyl styrene. Useful plasticizers include diotyl phthalate, 2-ethyl hexyl phosphate, tricresyl phosphate, and the like.

It is also within the scope of this invention to include various other components, such as pigments, fillers, stabilizers, or various polymeric additives.

The pressure-sensitive adhesives of the invention have been found to show little microsphere transfer, thereby reducing or even eliminating the transfer problems disclosed by the prior art even at coating weights giving high microsphere adhesion values. These pressure-sensitive adhesives also provide excellent sprayability and good peel adhesion for a given coating weight.

These and other aspects of the invention are illustrated by the following examples which should not be viewed as limiting in scope.

TEST METHODS

The following tests have been used to evaluate compositions of the invention. All percentages, parts and ratios are by weight unless specifically stated otherwise.

ADHESIVE COATING WEIGHT

A 2.54 cm. by 5.0 cm. piece of preweighed (W1) acetate film is taped to the edge of a piece of paper. Adhesive is sprayed in a steady and uniform manner across the paper and acetate film. The film is then dried first at 52° C. for one hour followed by drying at room temperature (about 22° C.) for one hour and reweighed (W2). The difference between the starting weight (W1) and the final weight (W2) is determined to be the adhesive coating weight for both substrates expressed in grams per 12.9 square centimeters.

PEEL ADHESION

Peel adhesion is the force required to remove a coated flexible sheet material from a test panel measured at a specific angle and rate of removal. In the examples, this force is expressed in grams per centimeter (cm.) width of coated sheet. The procedure followed is:

A strip 1.27 cm. in width of the coated sheet is applied to the horizontal surface of a clean glass test plate with at least 12.7 lineal cm. in firm contact. A 2 kg. hard rubber roller is used to apply the strip. The free end of the coated strip is doubled back nearly touching itself so the angle of removal will be 180 degrees. The free end is attached to the adhesion tester load cell. The glass test plate is clamped in the jaws of a tensile testing machine which is capable of moving the plate away from the scale at a constant rate of 2.3 meters per minute. The load cell reading in grams is recorded as the tape is peeled from the glass surface. The data is reported as the average of the range of numbers observed during the test in grams per centimeter width of strip.

ADHESIVE TRANSFER

"Adhesive transfer force" is that force necessary to cause a failure of the transferred adhesive. Therefore, a high value for this force is undesirable, as it would indicate a higher amount of adhesive had been transferred (therefore having higher adhesion). The lower the value, the lower the amount of adhesive transfer. This test is very sensitive at amounts of transfer up to about 25%; a small increase in adhesive transfer results in a relatively large increase in the force required to cause failure. After this level, a plateau of separation force is reached such that additional amounts of transfer result in smaller increases in the necessary force to cause failure of the adhesive.

In this test coated sheet material was adhered to a marked area of 60–80 lb. clay-coated paper, a commercially available paper for the printing industry, for a few seconds using a mechanical rolling action provided by an IMASS Slip Peel Tester and the removed by hand at a 90 degree angle. A 3.2 cm. wide strip of polyethylene terephthalate polyester film was then adhered to the clay-coated paper by mechanical means (above) to provide a composite having a 20 cm. long overlap. The composite is removed from the Peel Tester and the clay-coated paper end is clamped in the upper jaw of an Instron TM Tensile Tester and the polyester film end is clamped in the lower jaw. Using a crosshead separation speed of 2.5 cm. per minute, the peak separation force for the sample is determined and reported as grams.

INHERENT VISCOSITY MEASUREMENT

Inherent viscosity is measured by conventional means using a Cannon-Fenske #50 viscometer in a water bath controlled at 25° C. to measure the flow time of 10 milliliters of a polymer solution (0.2 g. of polymer per deciliter of ethyl acetate). The inherent viscosity (IV) is reported as deciliter per gram (dl/g).

The following examples are illustrative in nature, and are not intended to limit the invention in any way. The scope of the invention is that defined by the claims only.

EXAMPLES

Preparation of microspheres M1

In a one liter reactor equipped with mechanical stirrer, thermometer and inlet-outlet lines for vacuum and argon, 350 grams of deionized water, 141 grams of isooctyl acrylate, 9 grams of acrylic acid and 0.5 grams of benzoyl peroxide were charged. Vacuum was applied to evacuate the reactor atmosphere, and the reactor was then purged with argon. The agitation was set to 400 RPM and when the initiator had dissolved 7.0 grams of Triton TM X-100 (trade name for sodium octylphenoxy polyethoxyethyl sulfonate available from Rohm and Haas Company) were added along with 100 grams of water. The temperature of the reactor was raised to 65° C. and maintained for 22 hours. An argon purge was maintained during the polymerization. After the 22-hour period, the suspension was allowed to cool to room temperature. The reactor was then emptied and the suspension filtered. Optical microscopy of the suspension showed solid microspheres 5 to 100 microns in diameter. The microspheres were isolated by addition of an aqueous solution of barium chloride (0.3 wt. %) and filtered.

Preparation of microspheres M2

In a one liter reactor equipped with mechanical stirrer, thermometer and inlet-out lines for vacuum and nitrogen, 450 grams of deionized water and 6 grams of acrylic acid were added. Concentrated ammonium hydroxide was added until the pH of the aqueous solution was 7.0. To this solution 1.5 grams of ammonium lauryl sulfate (Standapol A TM, Henkel AG) were added. 0.5 grams of benzoyl peroxide were dissolved in 144 grams of isooctyl acrylate and the solution added to the reactor while stirring to 350 RPM. A nitrogen purge was applied to the reactor, and the temperature of the reactor was raised to 65° C. and maintained at such temperature for 15 hours. After the 15 hour period the suspension was cooled to room temperature. The reactor was then emptied and the suspension filtered. Optical microscopy of the suspension showed solid microspheres 5 to 100 microns in diameter. The microspheres were isolated by addition of acetone followed by filtration.

Preparation of the Macromoner Containing Binder Copolymer

In a glass reaction bottle, 8 grams of a 10,000 molecular weight methacrylate-terminated polystyrene macromonomer was combined with the monomers listed in Table A, 300 grams of ethyl acetate, 0.6 grams of the initiator, Vazo TM 64 (azo-bis-isobutyronitrile available from DuPont), and carbon tetrabromide dissolved in isooctyl acrylate. The percentages of carbon tetrabromide shown in Table A are based on the total amount of monomers (200 g of monomer mixture). The bottle was then purged with nitrogen, sealed and tumbled in a water bath at 55° C. for 24 hours.

TABLE A

| Binder | IOA g | ACM g | NVP g | AA g | CBr$_4$ % | I.V. g/dl |
|---|---|---|---|---|---|---|
| A | 184 | 8.0 | — | — | 0.020 | 1.02 |
| B | 184 | 8.0 | — | — | 0.090 | 0.61 |
| C | 184 | 8.0 | — | — | 0.150 | 0.43 |
| D | 184 | — | — | 8.0 | 0.075 | 0.57 |

TABLE A-continued

| Binder | IOA g | ACM g | NVP g | AA g | CBr$_4$ % | I.V. g/dl |
|---|---|---|---|---|---|---|
| E | 162 | — | 30.0 | — | 0.075 | 0.58 |

IOA: isooctyl acrylate
ACM: acrylamide
NVP: N-vinyl pyrrolidone
AA: acrylic acid

Dynamic Mechanical Thermal Analysis (DMTA)

Polymer specimens were prepared by solvent casting relatively thick films, ca. 2 mm in thickness, that were carefully air dried at room temperature for seven days, followed by 24 hour drying in vacuo. The shear storage modulus, G', was then determined using a Polymer Laboratories DMTA Mark I, (Amherst Fields Research Park, Amherst, Me. 01002) at 3 Hz and 22° C. The data for a series of polymers is given in Table B below.

TABLE B

| Binder | Compositions | I.V. | G' (Pa × 10$^5$) | T(°C.) |
|---|---|---|---|---|
| B | IOA/ACM/MAC$^{1,3}$ (92/4/4) | 0.61 | 1.205 | 23 |
| A | IOA/ACM/MAC$^{2,3}$ (92/4/4) | 1.02 | 1.253 | 22 |
| — | IOA/AA/MAC$^{1,3}$ (92/4/4) | 0.60 | 1.050 | 22 |
| E | IOA/NVP/MAC$^{1,3}$ (81/15/4) | 0.58 | 0.978 | 23 |

[1] Polystyrene macromonomer, MW = 10,000
[2] Polysar macromonomer, C-4500
[3] IOA, iso-octyl acrylate; ACM, acrylamide, AA, acrylic acid; NVP, N-vinyl pyrrolidone

Comparative Examples 1C-3C

The comparative compositions were prepared by first dispersing the microspheres in a solvent mixture of 60:40 by weight isohexane:acetone to yield an 11–12% dispersion of the microspheres in the solvent to obtain an aerosol premix. The premix was then added to a 6 fluid ounce metal aerosol container fitted with the appropriate gaskets, valves, and a spray-button actuator. The aerosol container was then charged with an isobutane propellant (A-31, isobutane having 31 psig at 21° C.) to bring the total solids to 5–6%. Table 1 shows peel adhesion and adhesive transfer data for the aerosol spray coating of microspheres on standard white copier paper.

TABLE 1

| Example | Microsphere | Co reduction in the adhesive transfer force is obtained for microspheres M1.

The compositions were prepared by first dispersing the microspheres in a solvent mixture of 60:40 by weight isohexane:acetone to yield a 12% dispersion of microspheres in the solvent. An ethyl acetate solution of the macromonomer-containing binder copolymer with the composition and I.V. described in Table A was prepared and added to the microsphere dispersion to obtain an aerosol premix. This premix was then added to a six-fluid ounce metal aerosol container fitted with the appropriate gaskets, valves, and a spray-button actuator, and the aerosol container was then charged with an isobutane propellant (A-31, isobutane having 31 psig at 21° C.) to bring the total solids to 5-6%. The amounts of macromonomer-containing binder copolymer based on dry weight of solid microspheres, the peel adhesion and the adhesive transfer force for the aerosol spray coatings are shown in Table 2. The substrate used was standard white copier paper.

TABLE 2

| Example | Binder | Wt % | Coating Weight g/12.9 cm$^2$ | Peel Adhesion g/cm | Adhesive transfer force g |
|---|---|---|---|---|---|
| 4 | A | 10 | 0.005 | 25.51 | 4,905 |
| 5 | A | 20 | 0.005 | 29.29 | 4,961 |
| 6 | B | 20 | 0.004 | 25.51 | 5,528 |
| 7 | B | 30 | 0.005 | 25.51 | 5,330 |
| 8 | C | 20 | 0.005 | 28.66 | 5,613 |
| 9 | D | 20 | 0.006 | 29.92 | 6,662 |
| 10C | E | 20 | 0.005 | 28.35 | 7,655 |

Example 11

The following example illustrates the reduction in the adhesive transfer force when macromonomer-containing copolymer binder B was used with microspheres M2. The aerosol spray adhesive was prepared as in Examples 4 through 10C. The substrate was standard white copier paper.

| Example | Wt % | Coating weight g/12.9 cm$^2$ | Peel Adhesion g/cm | Adhesive transfer force g |
|---|---|---|---|---|
| 11 | 20 | 0.005 | 20.16 | 6,294 |

What is claimed is:

1. A sheet material having coated on at least a portion thereof a repositionable pressure-sensitive adhesive comprising:
   a) from about 70% to about 99% solid, polymeric, acrylate, inherently tacky, infusible, solvent-insoluble, solvent-dispersible, elastomeric microspheres comprising
      i) at least one alkyl acrylate or alkyl methacrylate ester; and
      ii) at least one polar monomer, and
   b) correspondingly from about 1% to about 30% of a binder copolymer comprising an elastomeric polymeric backbone having pendant therefrom polymeric moieties, said backbone containing repeating A and C monomers and from about 1% to about 20% B monomers, wherein
   A is a monomeric acrylic or methacrylic acid ester of a non-tertiary alcohol, said alcohol having from 1 to 14 carbon atoms, with the average number of carbon atoms being about 4–12, said A monomer comprising from about 50% to about 98% of said monomers;
   B is a polar monomer copolymerizable with said monomeric acrylic acid ester;
   C is a monomer having the general formula X—(Y)$_n$—Z, wherein
   X is a vinyl group copolymerizable with said A and B monomers,
   Y is a divalent linking group, where n is zero or 1, and
   Z is a monovalent polymeric moiety having a T$_g$ greater than 20° C., and a molecular weight in the range of about 2,000 to about 30,000 and being essentially unreactive under copolymerization conditions, C comprising from about 1% to about 30% of said monomers,
   wherein said binder copolymer has a shear storage modulus of at least about 1 × 10$^5$ Pascals at 3 Hz and 22° C.

2. An organic dispersion comprising an organic carrier liquid and
   a) solid, polymeric, acrylate, inherently tacky, infusible, solvent-insoluble, solvent-dispersible, elastomeric microspheres comprising
      i) at least one alkyl acrylate or alkyl methacrylate ester; and
      ii) at least one polar monomer, and
   b) a binder copolymer comprising an elastomeric polymeric backbone having pendant therefrom polymeric moieties, containing repeating A and C monomers and from about 1% to about 20% B monomers, wherein
   A is a monomeric acrylic or methacrylic acid ester of a non-tertiary alcohol, said alcohol having from 1 to 14 carbon atoms, with the average number of carbon atoms being about 4–12, said A monomer comprising from about 50% to about 98% of said monomers;
   B is a polar monomer copolymerizable with said monomeric acrylic acid ester;
   C is a monomer having the general formula X—(Y)$_n$—Z, wherein X is a vinyl group copolymerizable with said A and B monomers, Y is a divalent linking group, where n is zero or 1, and Z is a monovalent polymeric moiety having a T$_g$ greater than 20° C., and a molecular weight in the range of about 2,000 to about 30,000, and being essentially unreactive under copolymerization conditions, C comprising from about 1% to about 30% of said monomers,
   wherein said binder copolymer has a shear storage modulus of at least about 1 × 10$^5$ Pascals at 3 Hz and 22° C.

3. A sheet material having coated on at least a portion thereof the organic dispersion of claim 2.

4. A repositionable pressure-sensitive adhesive comprising the organic dispersion of claim 2.

* * * * *